Figure 1:
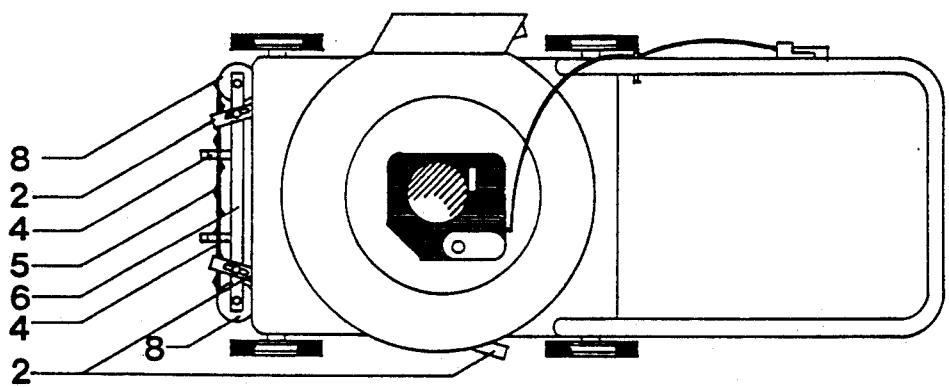

United States Patent [19]
Lee

[11] Patent Number: 5,274,924
[45] Date of Patent: Jan. 4, 1994

[54] WEED, BRUSH AND SMALL TREE CUTTER

[75] Inventor: Richard A. Lee, 3508 Sandpiper Cir., Port St. Lucie, Fla. 34952

[73] Assignee: Richard A. Lee, Port St. Lucie, Fla.

[21] Appl. No.: 967,767

[22] Filed: Oct. 28, 1992

[51] Int. Cl.⁵ .................. A01G 23/08; B27B 17/02
[52] U.S. Cl. ........................ 30/379; 30/381; 30/383; 56/244; 56/291
[58] Field of Search .......... 56/244, 290, 291, 292; 30/379, 381, 382, 383, 394, 500; 144/34

[56] References Cited
U.S. PATENT DOCUMENTS

| | | | |
|---|---|---|---|
| 789,512 | 5/1905 | Waller | 144/34 R |
| 1,054,693 | 3/1913 | Klingele | 141/34.12 |
| 3,483,905 | 12/1969 | Lawrence | 144/34 |
| 3,675,689 | 7/1972 | Rice | 30/379 |
| 3,979,827 | 9/1976 | Anzur | 30/379 |
| 4,258,763 | 11/1978 | Figueredo et al. | 144/34 |

Primary Examiner—W. Donald Bray

[57] ABSTRACT

A device that attaches to a rotary lawn mower to convert it into a weed, brush and small tree cutter. The rotating blade of the lawn mower is replaced with a drive sprocket that engages a continuous loop cutting element. The cutting element is retained in front of the mower by pulley guides. The pulley guides are retained by adjustable brackets attached to the mower. The cutting element is protected by guards that project in front of the mower.

5 Claims, 2 Drawing Sheets

WEED, BRUSH AND SMALL TREE CUTTER

BACKGROUND

1. Field

This invention relates to a cutting device that has a flexable cutting element that is in the form of a continuous loop with cutting teeth around the periphery of the loop.

2. Description of Prior Art

A number of devices currently exist to cut weeds, brush and small trees. However most of these devices are restricted to cutting either weeds, brush or small trees. The systems that are capable of cutting weeds, brush and small trees are expensive and not practical for clearing a small area. Some farm tractors can attach a sicklebar or rotary mower blade to them for cutting weeds and brush. This works very well but is not practical for a person who has a small area or field to clear. Brush hogs and tractor mounted mowers are too big and difficult to maneuver for close work around the home.

TROY-BILT manufactures a manually operated device that has a sicklebar on it. The operator walks behind it to guide it. It again is a rather large and expensive device that is difficult to move from one area to another and is not practical for the average person who has a small area to cut.

A rotary type brush and small tree cutter is shown by Lawerence U.S. Pat. No. 3,483,905. This again has a major disadvantage that it must be carried and driven by a larger vehicle such as a tractor. It cannot be easily maneuvered in small areas.

Rice et. al. U.S. Pat. No. 3,675,689 shows a wheeled carrier for a chain saw. This device would be appropriate for cutting of trees but would be useless in cutting flexible weeds and brush because of the relatively slow moving chain. Cutting weeds requires either a scissors type cutting action or a fast moving cutting element. Weeds also tend to clog a chain saw.

Angus U.S. Pat. No. 3,979,827 shows an attachment for a power mower that can be used to cut trees. This device has no means for oiling the chain and again the chain cannot move at relatively high speed because of the support arm and the required small diameter of the drive wheel.

Friguredo et. al. U.S. Pat. No. 4,258,763 shows a flexible cutting element but it is not a continuous loop. The device imparts an oscillating motion to the cutting element. This oscillating motion severely restricts the velocity attainable by the cutting element. The cutting element must stop and reverse itself twice during each cycle and the unbalanced nature of the drive mechanism restricts its maximum velocity.

OBJECTS AND ADVANTAGES

The present invention can be manufactured as a weed and brush cutter or it can be easily fit onto an existing lawn mower. Both of these methods of producing the invention have the following objects and advantages.

(a) To provide an inexpensive method for cutting weeds, brush and small trees.

(b) To provide a method that is easy to use. Anyone who can use a lawn mower can use this invention.

(c) To provide an efficient method to cut weeds and brush. It will cut weeds, brush and small trees.

One of the major advantages this invention has over existing systems is its simplicity. It can be easily produced and used.

DRAWING FIGURES

Figure 2:
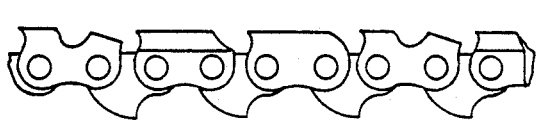
Figure 3:
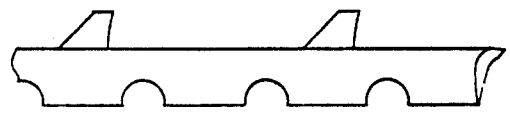
Figure 4:
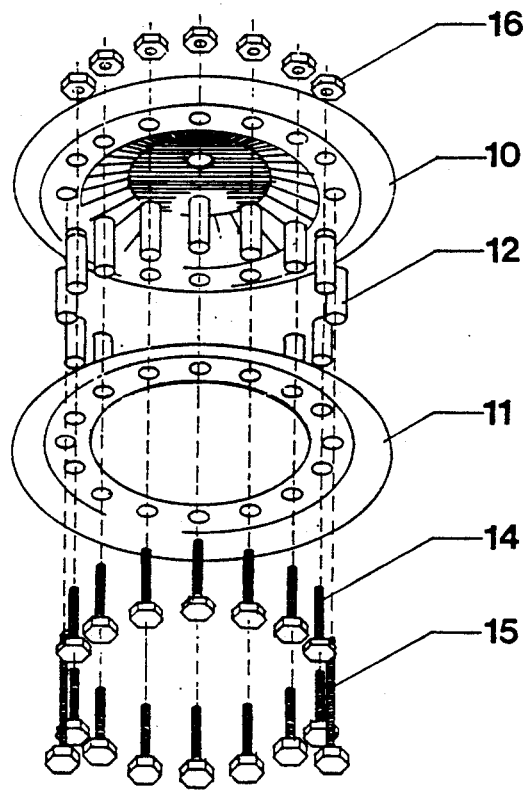
Figure 5:
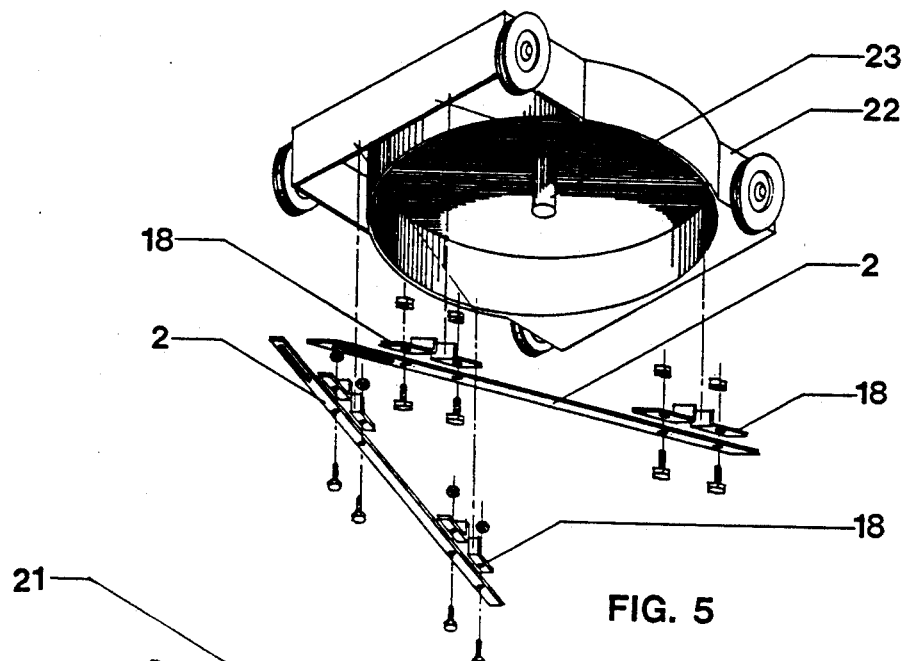
Figure 6:
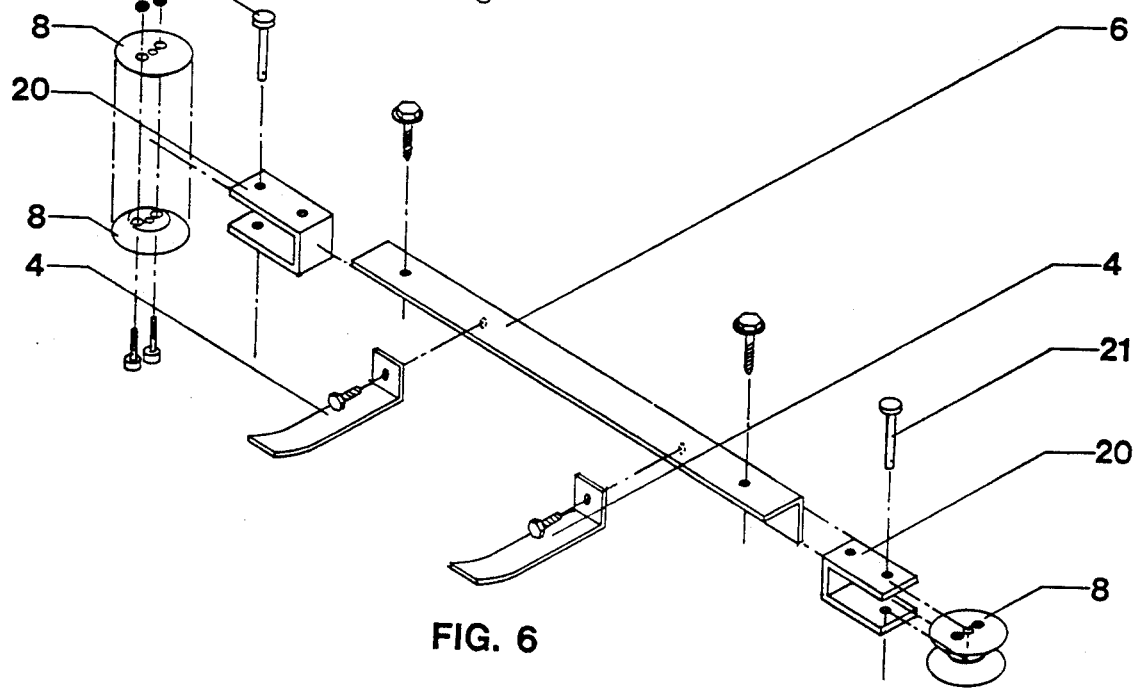

FIG. 1. Plan view of system attached to a lawn mower.
FIG. 2. Chain saw cutting element.
FIG. 3. V-belt cutting element.
FIG. 4. Drive sprocket.
FIG. 5. Retaining brackets and clamps.
FIG. 6. Front bar, chain guards and pulley guides.

COMPONENT NUMBERS

| | |
|---|---|
| (2) | Retaining brackets |
| (4) | Cutting element |
| (5) | Cutting element |
| (6) | Front element |
| (8) | Pulley guides |
| (10) | Top drive sprocket |
| (11) | Bottom drive sprocket |
| (12) | Drive sprocket spacers |
| (14) | Drive sprocket bolts |
| (15) | Long drive sprocket bolts |
| (16) | Retaining nuts |
| (18) | Retaining bracket clamps |
| (20) | Pulley guide retainers |
| (21) | Clevis pin |
| (22) | Mower chassics |
| (23) | Motor drive shaft |

DESCRIPTIONS OF DRAWINGS

The drawings and descriptions of the drawings will demonstrate the simplicity of the device.

FIG. (1) is plan view of the components of the invention. The brackets (2) are required when the device is attached to an existing lawn mower. These brackets are slotted to allow for minor adjustments to accommodate different lawn mowers. This is shown in more detail in FIG. (5). The brackets are held to the mower by angle clamps (18). A mower has a guard around the rotating blades. The angle clamps are clamped to this guard. This is shown in FIG. (5). To attach the system to a lawn mower the rotating blade is first removed and replaced by the drive sprocket. The drive sprocket is shown in FIG. (4).

The drive sprocket (10) is attached to the drive shaft of the motor (23). FIG. (4) shows an exploded view of the drive sprocket. The top half of the drive sprocket is shaped like a bowl. The shape is necessary to lower the sprocket to the proper height. The sprocket is attached to the drive shaft with the same mounting hardware used for the lawn cutting blades. The two sides of the sprocket are held apart by spacers (12). They also serve as the teeth of the sprockets. Some of the bolts (15) are longer than required. These longer bolts are necessary to prevent weeds getting tangled on the motor drive shaft. The speed of the cutting element is directly proportional to the radius of the teeth of the drive sprocket. This radius can be altered to achieve desired cutting element speed. A radius of one to two inches is appropriate for most applications.

The drive sprocket engages the cutting element. Two types of cutting elements are shown in FIG. (2) and (3). Both of these cutting elements can be successfully used with this hardware. FIG. (2) is a chain saw cutting element and FIG. (3) is a Notched V-belt cutting element that has embeded teeth. The cutting element is retained in front of the mower in proper cutting position by the pulley guides (8). These are shown in more detail in FIG. (6). The pulley guide holders (20) are held in position by front guide bar (6). The guide bar is slotted to allow minor adjustments of the pulley guides. The pulley guides are held with a clevis pin (21).

The cutting element guards (4) are also attached to the front guide bar. They are to protect the cutting element from encountering foreign objects. To allow for easy starting of the motor the cutting element cannot be adjusted too tight on the sprockets and the guides. The adjustment should allow for some slack in the cutting element.

The front guide bar is held by brackets (2). These brackets are also held to the frame of the mower by clamps (18). The clamps can be put in opposing positions or they can be held by the same bolts.

This is shown in FIG. (5). The position of the clamps are dictated by the curvature of the bottom lip of the mower. Several different configurations of brackets and clamps are possible. The configuration shown here has proven to be successful in most applications. These brackets and clamps are not required if the unit is manufactured as a weed and brush cutter.

SUMMARY

This invention can be a weed and brush cutter or it can be attached to a lawn mower to convert it into a weed and brush cutter. It consists of a cutting element that is in the form of a continuous loop with teeth around its periphery. A drive sprocket attaches to the motor and engages the cutting element. The front guides retain and position the cutting element in front of the mower in the proper cutting position. The guides are held with adjustable brackets that attach to the frame of the mower.

The method of cutting weeds and brush shown by this invention has considerable advantages over the prior art. It is versatile and can cut weeds, brush and small trees. It is relatively simple and inexpensive. It can be produced at considerably less cost than currently existing systems. It is easy to use. Anyone who can use a lawn mower can use this invention.

I claim:

1. A weed and brush cutter attachment for a rotary power mower, of wheeled construction for moving said mower relative to ground, with rearward projecting handle for manipulating said mower, of the type with motor having a generally vertically oriented drive shaft comprising, a drive sprocket, interchangeable with mower cutting blade, attached to said motor drive shaft a cutting element in the form of a continuous loop, with cutting teeth dispersed around its periphery engaging said drive sprocket to impact movement to said cutting element cutting element guides that position and retain said cutting element in front of said mower in close proximity to ground with said cutting element loop encompassing said cutting element guides and said drive sprocket brackets attached to frame of said mower molding said cutting element guides in front of said mower to maintain said cutting element in cutting position, whereby said mower can be manipulated with said handle to bring said cutting element into cutting engagement with weeds and brush.

2. An attachment in accordance with claim 1, including means for adjustment between said brackets and said cutting element guides for proper tensioning of said cutting element.

3. An attachment in accordance with claim 1, including means for preventing said cutting element from contacting ground or foreign objects with cutting element guards attached to said brackets extending beneath and in front of said cutting element.

4. A device for cutting weeds, brush and small tress comprising a platform of wheeled construction for moving said platform relative to ground a motor mounted on said platform with drive shaft of motor oriented downward in a generally vertical direction a drive sprocket mounted on end of said drive shaft in close proximity to ground a cutting element in the form of a continuous loop with cutting teeth dispersed around its periphery engaging said drive sprocket to impart movement to said cutting element cutting element guides that position and retain said cutting element in front of said mower in close proximity to ground with said cutting element loop encompassing said cutting element guides and said drive sprocket a rearward projecting handle attached to said platform for manipulating said cutting element into cutting engagement with weeds and brush.

5. A device in accordance with claim 4 including means for adjustment between said platform and said cutting element guides for proper tensioning of said cutting element.

* * * * *